No. 664,783. Patented Dec. 25, 1900.
E. M. ROSENBLUTH.
CARRIAGE LAMP.
(Application filed July 30, 1900.)
(No Model.) 2 Sheets—Sheet 1.
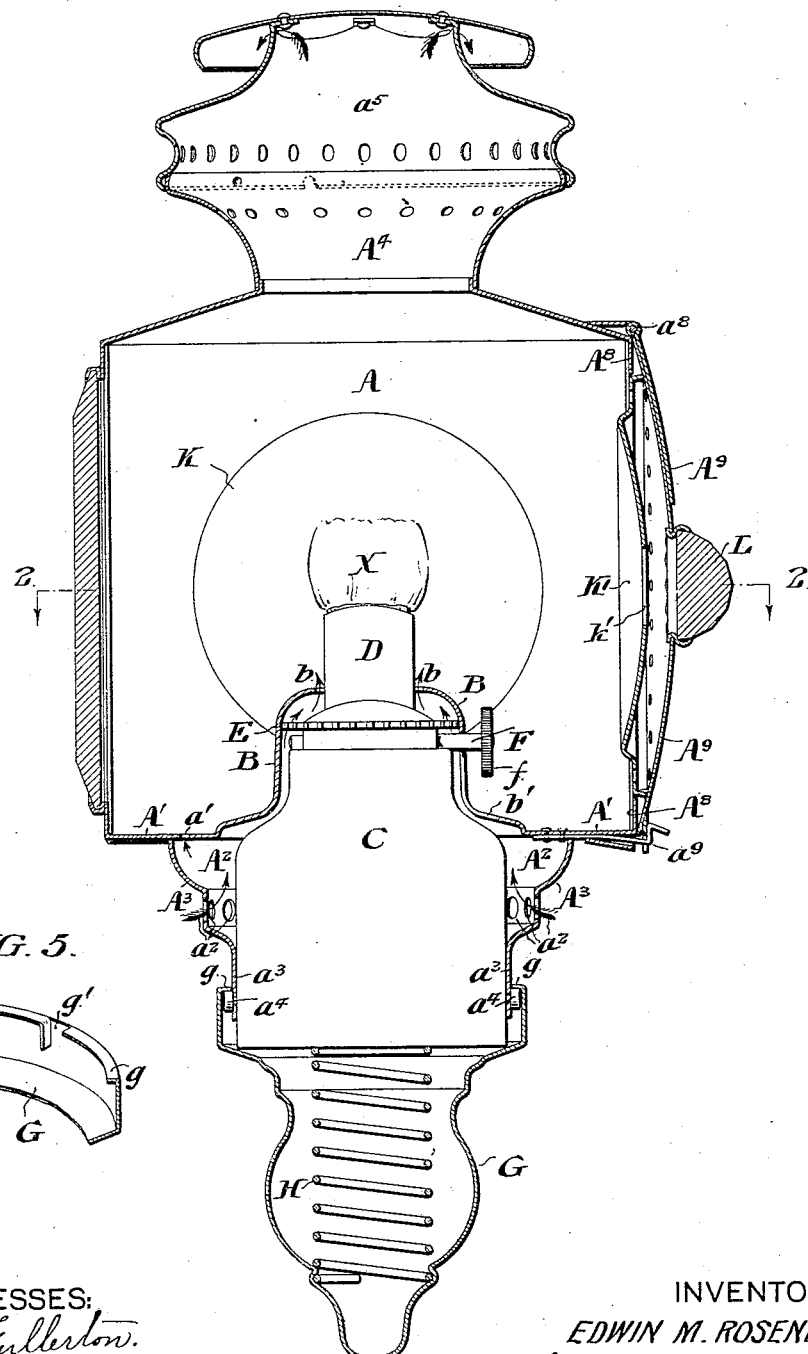
WITNESSES:
E. L. Fullerton.
Clifton C. Hallowell
INVENTOR:
EDWIN M. ROSENBLUTH,
by Arthur E. Paige,
Atty.

No. 664,783. Patented Dec. 25, 1900.
E. M. ROSENBLUTH.
CARRIAGE LAMP.
(Application filed July 30, 1900.)
(No Model.) 2 Sheets—Sheet 2.
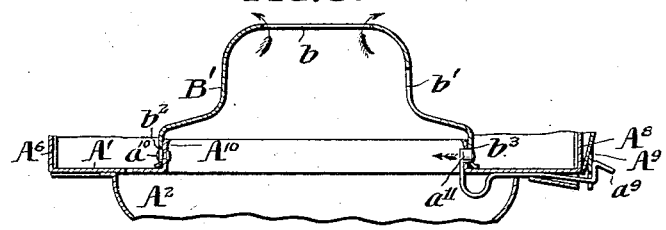
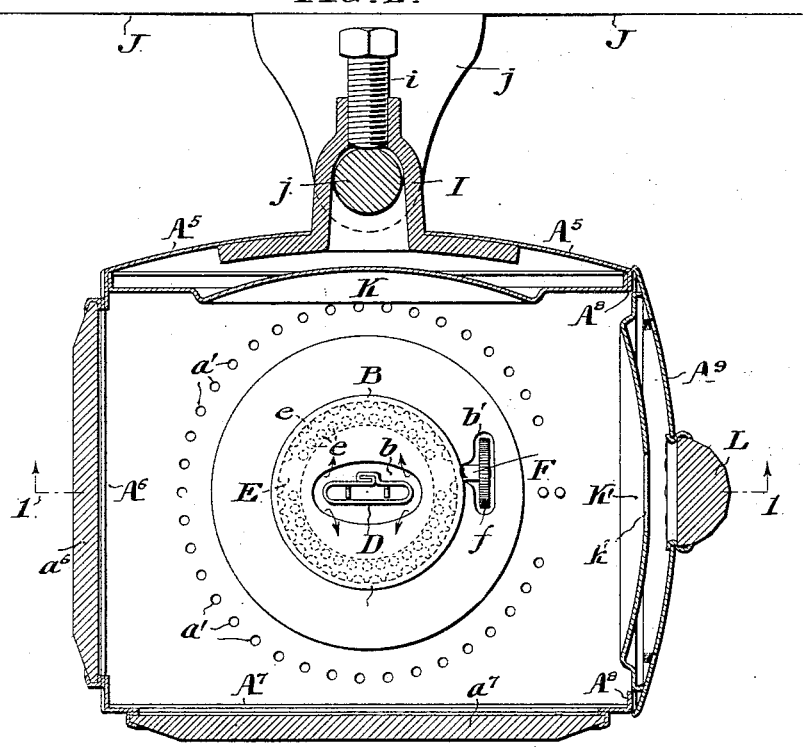
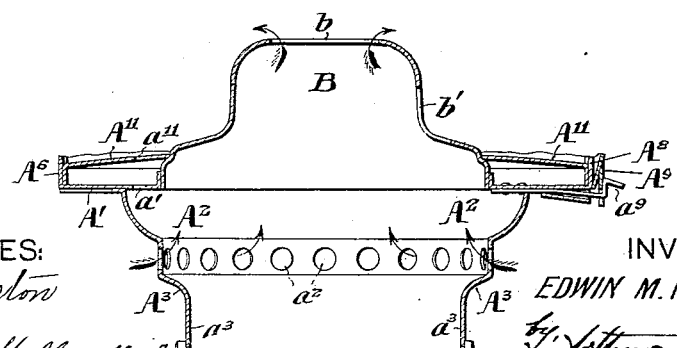
WITNESSES: E. L. Fullerton, Clifton C. Hallowell
INVENTOR: EDWIN M. ROSENBLUTH, by Arthur E. Page, Atty.

UNITED STATES PATENT OFFICE.

EDWIN M. ROSENBLUTH, OF PHILADELPHIA, PENNSYLVANIA.

CARRIAGE-LAMP.

SPECIFICATION forming part of Letters Patent No. 664,783, dated December 25, 1900.

Application filed July 30, 1900. Serial No. 25,271. (No model.)

*To all whom it may concern:*

Be it known that I, EDWIN M. ROSENBLUTH, of Philadelphia, in the county of Philadelphia and State of Pennsylvania, have invented certain new and useful Improvements in Carriage-Lamps, whereof the following is a specification, reference being had to the accompanying drawings.

My invention consists of a carriage-lamp arranged to burn oil within an inclosed flame-chamber provided with means to draft a supply of air from the exterior of said chamber and discharge the same within said chamber around the burner and directly below the flame at the top thereof. My invention comprises what I shall hereinafter term a "draft-dome," which projects within said flame-chamber, from the floor thereof, and surrounds the oil-receptacle and the burner-tube upon the latter. Said dome serves both as a protective casing for the oil-receptacle and as a conduit for the air-draft to the burner, in combination with other elements of the lamp structure, as hereinafter described and claimed.

In the accompanying drawings, Figure 1 is a vertical sectional view of a lamp conveniently embodying my invention. Fig. 2 is a horizontal sectional view of said lamp, taken on the line 2 2 of Fig. 1. Fig. 3 is a vertical sectional view showing a detachable draft-dome. Fig. 4 is a vertical sectional view showing a modified construction of the flame-chamber floor. Fig. 5 is a fragmentary perspective view showing the device by which the bottom cap is secured.

In said figures, A is the flame-chamber, whose floor A' is provided with an upwardly-projecting air-draft dome B, having an air-outlet $b$ at its top. The bottom of said dome B opens into an annular air-draft chamber $A^2$, inclosed by the flange $A^3$, which depends from the floor of the flame-chamber. Said flange $A^3$ is provided with air-inlet apertures $a^2$, so arranged that the motion of the carriage to which the lamp is fixed causes an inrush of air to the flame-chamber through the chamber $A^2$ and dome B. I also find it convenient to provide air-openings from said chamber $A^2$ to the flame-chamber aside from said dome B, as indicated at $a'$, in the floor A'. The products of combustion, surplus air, &c., escape from said flame-chamber by chimney $A^4$.

As shown in Fig. 1, the lower edge $a^3$ of the flange $A^3$ embraces the oil-receptacle C and serves to retain the same in concentric relation with the draft-dome B, and the upper portion of said receptacle C being of smaller diameter than the dome B, which incloses it, an annular air-draft space exists between said receptacle and said dome, through which the forced draft of air passes to the outlet $b$ and in passing cools said receptacle, becoming heated to render the flame whiter.

It is to be noted that the burner-tube D, upon the top of the receptacle C, extends through the top of the dome B and that the air is delivered through said opening $b$, around said tube D, and below the flame X, thereby insuring a sufficient supply of oxygen directly to the latter and corresponding efficiency of combustion and illumination.

In order that the current of air from the exterior of the lamp through the draft-dome B may be evenly distributed at the dome-outlet $b$ around the burner-tube D, I provide a baffle-flange E within said dome, which flange is serrated and perforated, as indicated at $e$ in Fig. 2, and as a matter of convenience is connected with the receptacle C. Said receptacle C is retained at the proper height in the dome B by means of the wick-shaft F, which encounters the top of the slot $b'$ in the side of the dome B, which slot is shaped, as shown in Fig. 2, to permit the passage of the milled head $f$ of the wick-shaft. The receptacle C is removably secured in operative relation with the dome B by means of the bottom cap G, whose flange $g$ is provided with bayonet catch-openings $g'$, arranged to engage the studs $a^4$, fixed at the bottom of the flange $A^3$. Said cap G is provided with a spring H, which when the parts are assembled as shown in Fig. 1 bears upon the bottom of the receptacle C and not only prevents the accidental displacement of the cap G, but also serves to clamp the wick-shaft F against the top of the slot $b'$, and thus prevent the accidental rotation of the wick-shaft.

As shown in Fig. 2, the wall $A^5$ of the flame-chamber A is provided with a socket I and set-screw $i$, whereby the lamp may be supported upon a suitable bracket $j$ in fixed relation with a carriage J. However, it is to be understood that it is not essential for my invention to be attached to a carriage by the means shown, although it is essential for the operation of the lamp, as above described, that it be so supported with respect to the carriage that the motion of the latter shall induce a forced draft of air from the exterior of the lamp through the openings $a^2$ and dome B.

As indicated in Fig. 2, the front wall $A^6$ and outer wall $A^7$ of the flame-chamber A are provided with respective glass panels $a^6$ $a^7$. I also find it convenient to provide the rear wall $A^8$ of the chamber with a door $A^9$, the top of which is hinged at $a^8$ and the bottom of which is provided with a spring-catch $a^9$, as shown in Fig. 1, so that access may be had to the milled head $f$ of the wick-shaft F without removing the receptacle C from the dome. It is to be noted, however, that said receptacle is entirely inclosed by said dome, so that any free oil which may seep out at the top of the receptacle is retained within the dome and excluded from the flame-chamber.

I find it convenient to provide the chimney $A^4$ with a removable cap $a^5$ and to provide the flame-chamber with reflectors K K′, the latter being fixed to the door $A^9$ and having a central aperture $k'$ to permit the transmission of light through the rear signal-jewel L. However, the precise details of construction of the flame-chamber are not of the essence of my invention.

In Fig. 3 I have shown a modified form of my invention wherein the floor A′ of the flame-chamber is provided with an upwardly-projecting flange $A^{10}$, to which the draft-dome B′ is removably secured, said flange $A^{10}$ being provided with a fixed stud $a^{10}$, which engages a corresponding aperture $b^2$ in the bottom edge of the dome, and the opposite side of said flange $A^{10}$ being provided with a spring-stud $a^{11}$, which engages a corresponding aperture $b^3$ in the bottom edge of said dome. When the stud $a^{11}$ is thrust in the direction of the arrow upon Fig. 4, the dome B′ is disengaged at that side and may be uplifted, disengaged from the stud $a^{10}$ at the opposite side, and removed from the flange $A^{10}$.

In the form of my invention shown in Fig. 4 the dome B is in fixed relation with the floor A′, as in the form of my invention shown in Figs. 1 and 2; but a false floor $A^{11}$ is secured in fixed relation with said dome and the floor A′. Said floor $A^{11}$ is conveniently provided with apertures $a^{11}$, in such relation with the apertures $a'$ in the floor A′ as to break and distribute the current of air passing through the latter from the chamber $A^2$ to the chamber A.

I am aware that hitherto a carriage-lamp has been made provided with what is known as a "candle-cap," which projects within the flame-chamber of the lamp from the floor thereof. It is to be noted, however, that such a cap serves merely to predetermine the position of the candle inclosed by it and does not serve as a conduit for an air-draft.

I do not desire to limit myself to the particular construction I have illustrated, as it is obvious that various modifications may be made without departing from the essential features of my invention.

I claim—

1. In a carriage-lamp, the combination with a flame-chamber, of a dome projecting within said chamber from the floor thereof, an oil-receptacle beneath said dome in removable relation therewith, a burner-tube upon said receptacle projecting through the top of said dome, an air-inlet at the bottom of said dome, and an air-outlet from said dome around and below the top of said burner-tube, substantially as set forth.

2. In a carriage-lamp, the combination with a flame-chamber, of a dome projecting within said chamber from the floor thereof, an oil-receptacle beneath said dome in removable relation therewith, a burner-tube upon said receptacle, projecting through the top of said dome, an air-inlet at the bottom of said dome, an air baffle-flange within said dome, above said inlet, and an air-outlet from said dome above said baffle-flange around and below the top of said burner-tube, substantially as set forth.

3. In a carriage-lamp, the combination with a flame-chamber, of a dome projecting within said chamber from the floor thereof, an oil-receptacle beneath said dome in removable relation therewith, a wick-tube upon said receptacle, a wick-shaft upon said receptacle, an opening in the top of said dome, an opening in the side of said dome, and means to secure said receptacle in removable relation with said flame-chamber, with said wick-tube projecting through the top of said dome, and said wick-shaft projecting through the side of said dome, substantially as set forth.

4. In a carriage-lamp, the combination with a flame-chamber, of a dome projecting within said chamber, from the floor thereof, an oil-receptacle beneath said dome in removable relation therewith, an air-draft space surrounding said receptacle, between the same and said dome, an air-outlet to said draft-space, at the bottom of said dome, an air-outlet from said draft-space at the top of said dome, and a burner-tube upon said receptacle projecting above said dome, through said air-outlet in the top thereof, substantially as set forth.

5. In a carriage-lamp, the combination with a flame-chamber, of a dome projecting within said chamber, from the floor thereof, an annular flange depending below said floor, of larger diameter than said dome, an air-inlet in said flange, an air-outlet through said floor, between said flange and said dome, an oil-receptacle fitted beneath said dome with an intervening air-draft space surrounding said receptacle, a burner-tube upon the top of said receptacle, projecting through the top of said dome, and an air-outlet in the top of said dome, around and below the top of said burner-tube, substantially as set forth.

6. In a carriage-lamp, the combination with a flame-chamber, of a dome projecting within said chamber, from the floor thereof, an oil-receptacle beneath said dome in removable relation therewith, a burner-tube upon said receptacle projecting through the top of said dome, an air-inlet at the bottom of said dome, an air baffle-flange fixed upon said receptacle, above said inlet, and an air-inlet from said dome, above said baffle-flange, around and below the top of said burner-tube, substantially as set forth.

7. In a carriage-lamp, the combination with a flame-chamber, of a dome projecting within said chamber, from the floor thereof, an oil-receptacle beneath said dome, in removable relation therewith, a burner-tube upon said receptacle, projecting through the top of said dome, an air-draft space surrounding said receptacle between the same and said dome, an annular flange depending below said floor, of larger diameter than said dome, an air-inlet through said flange to said dome, an air-outlet through said floor between said depending flange and said dome, an air baffle-flange within said dome, above said floor, and an air-outlet from said dome above said baffle-flange, around and below the top of said burner-tube, substantially as set forth.

8. In a carriage-lamp, the combination with a flame-chamber, of a dome projecting within said chamber, from the floor thereof, an oil-receptacle beneath said dome, in removable relation therewith, a burner-tube upon the top of said receptacle, means to secure said receptacle beneath said dome, with said tube projecting through the top of said dome, and means to permit withdrawal of said receptacle from beneath said dome, substantially as set forth.

9. In a carriage-lamp, the combination with a flame-chamber; of an air-draft dome projecting within said chamber, and secured to the floor thereof, said dome being provided with a lateral opening $b'$, wider at its bottom than at its top, substantially as and for the purpose set forth.

10. In a carriage-lamp, the combination with a flame-chamber, of an air-draft dome projecting within said chamber, from the floor thereof, an annular flange fixed to said floor, and means on said flange to detachably engage the bottom edge of said dome, substantially as set forth.

11. In a carriage-lamp, the combination with a flame-chamber, of an air-draft dome projecting within said chamber, from the floor thereof, a stud in fixed relation with said floor and detachably engaged with the lower edge of said dome, and a stud in movable relation with said floor, detachably engaged with the lower edge of said dome, substantially as set forth.

12. In a lamp, the combination with an inclosed flame-chamber, of a draft-dome projecting within said chamber, from the floor thereof, a burner, surrounded by and projecting through the top of said dome, and means to conduct a draft of air through said dome, and discharge the same around and below the top of said burner, substantially as set forth.

EDWIN M. ROSENBLUTH.

Witnesses:
ARTHUR E. PAIGE,
CLIFTON C. HALLOWELL.